(12) United States Patent
Kusakabe

(10) Patent No.: US 9,984,084 B2
(45) Date of Patent: May 29, 2018

(54) INFORMATION PROCESSING APPARATUS, METHOD FOR CONTROLLING SAME, AND STORAGE MEDIUM

(71) Applicant: CANON KABUSHIKI KAISHA, Tokyo (JP)

(72) Inventor: Yuki Kusakabe, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 399 days.

(21) Appl. No.: 14/251,321

(22) Filed: Apr. 11, 2014

(65) Prior Publication Data
US 2014/0317091 A1   Oct. 23, 2014

(30) Foreign Application Priority Data

Apr. 19, 2013  (JP) .................................. 2013-088667

(51) Int. Cl.
*G06F 17/30* (2006.01)

(52) U.S. Cl.
CPC .. *G06F 17/30106* (2013.01); *G06F 17/30126* (2013.01)

(58) Field of Classification Search
CPC ...................... G06F 17/30106; G06F 17/30126
USPC ......................................................... 707/722
See application file for complete search history.

(56) References Cited

U.S. PATENT DOCUMENTS

| | | | | |
|---|---|---|---|---|
| 6,487,553 B1 * | 11/2002 | Emens | .............. | G06F 17/30864 |
| 7,797,635 B1 * | 9/2010 | Denise | .............. | G06F 17/30991 |
| | | | | 707/706 |
| 7,953,730 B1 * | 5/2011 | Bleckner | ........... | G06F 17/30864 |
| | | | | 707/722 |
| 8,037,060 B1 * | 10/2011 | Wang | ................ | G06F 17/30864 |
| | | | | 707/722 |
| 8,117,197 B1 * | 2/2012 | Cramer | ............. | G06F 17/30702 |
| | | | | 706/12 |

(Continued)

FOREIGN PATENT DOCUMENTS

| JP | 2002-183211 | 6/2002 |
|---|---|---|
| JP | 2009-301534 | 12/2009 |

OTHER PUBLICATIONS

Japanese Office Action issued Jan. 31, 2017 during prosucution of related Japanese application No. 2013-088667 (Whole English-language translation included).

*Primary Examiner* — Evan Aspinwall
(74) *Attorney, Agent, or Firm* — Fitzpatrick, Cella, Harper & Scinto

(57) ABSTRACT

An information processing apparatus that searches for a file based on a search condition, the apparatus comprising: a display unit configured to display a search screen and a search result screen; an item designating unit configured to designate an item as the search condition; an acquiring unit configured to acquire items displayed on the search screen; and an item determination unit configured to determine whether or not the item designated by the item designating unit is included in the items acquired by the acquiring unit, wherein, when the item determination unit determines that the item designated by the item designating unit is not included in the items acquired by the acquiring unit, the display unit adds the item designated by the designating unit to the items acquired by the acquiring unit, and displays the search result screen.

17 Claims, 16 Drawing Sheets

(56) References Cited

U.S. PATENT DOCUMENTS

| | | | |
|---|---|---|---|
| 8,166,065 B2* | 4/2012 | Arrouye | G06F 17/30067 707/774 |
| 8,688,667 B1* | 4/2014 | Kurzion | G06F 17/30867 706/16 |
| 2002/0099773 A1* | 7/2002 | Tsuru | G06F 17/30106 709/204 |
| 2004/0254938 A1* | 12/2004 | Marcjan | G06F 17/30106 |
| 2009/0182733 A1* | 7/2009 | Itoh | G06F 17/30011 |
| 2009/0187558 A1* | 7/2009 | McDonald | G06F 17/30696 |
| 2011/0289074 A1* | 11/2011 | Leban | G06F 17/30991 707/722 |
| 2013/0054583 A1* | 2/2013 | Macklem | G06F 17/30867 707/723 |
| 2014/0149390 A1* | 5/2014 | Chen | G06F 17/30867 707/722 |
| 2015/0269231 A1* | 9/2015 | Huynh | G06F 17/30864 707/722 |

\* cited by examiner

```
<?xml version="1.0" encoding="utf-16" standalone="yes"?>
<Cabinets>
<Cabinet DisplayName="Library1" LibraryRootPath="file:///C:/Users/xxxxx/Documents/MyLibrary" ProtocloIHandlerType="Local"/>
<Cabinet DisplayName="Library2" LibraryRootPath="http://100.100.21.95/sites/Library" ProtocloIHandlerType="Web"/>
</Cabinets>
```

```
<?xml version="1.0" encoding="utf-16" standalone="yes"?>
<Property>
    <ItemProperty Name="Name" Type="System.String" DisplayName="Name" Visible="True" Searchable="True" />
    <ItemProperty Name="Title" Type="System.String" DisplayName="Title" Visible="True" Searchable="True" />
    <ItemProperty Name="Created" Type="System.DateTime" DisplayName="Date Created" Visible="True" Searchable="True" />
    <ItemProperty Name="Type" Type="System.String" DisplayName="Type" Visible="True" Searchable="True" />
    <ItemProperty Name="FileSize" Type="System.Int64" DisplayName="Size" Visible="True" Searchable="True" />
    <ItemProperty Name="Location" Type="System.String" DisplayName="Location" Visible="True" Searchable="True" />
    <ItemProperty Name="Check" Type="System.String" DisplayName="Check" Visible="True" Searchable="True" />
    <ItemProperty Name="Validation" Type="System.String" DisplayName="Validation" Visible="True" Searchable="True" />
</Property>
```

FIG. 11A

| Search Dialog | | | — ☐ ✕ |
|---|---|---|---|

Favorite | Easy Search | Detail Search | ☐ View

Search Position : File:///C:/Document/Folder ▽ | Browse...
Condition 1 : Deadline ▽ ▷ Is On or Before ▽ ▷ 2013/03/29 ▽
Condition 2 : Status ▽ ▷ Contains ▽ ▷ Not yet ▽
Condition 3 : Name ▽ ▷ Contains ▽ ▷ PDF ▽

Relation: AND ▽ | Search | Clear

| Name | Date modified | Type | Size |
|---|---|---|---|

FIG. 11B

| Search Dialog | | | | | | □ × |
|---|---|---|---|---|---|---|

| Favorite | Easy Search | Detail Search | | | | ☐ View |
|---|---|---|---|---|---|---|

Search Position : File:///C:/Document/Folder ▽    Browse...
Condition 1 : Deadline ▽ ▷ Is On or Before ▽ ▷ 2013/03/29 ▽
Condition 2 : Status ▽ ▷ Contains ▽ ▷ Not yet ▽
Condition 3 : Name ▽ ▷ Contains ▽ ▷ PDF ▽

Relation: AND ▽   Search   Clear

| Name | Date modified | Type | Size | Deadline ▼ | Status |
|---|---|---|---|---|---|
| 📄 A.pdf | 2013/03/14 21:48 | PDF | 38KB | 2012/02/01 | Not yet |
| 📄 B.pdf | 2013/02/14 12:48 | PDF | 27KB | 2012/02/03 | Not yet |
| 📄 F.pdf | 2013/05/21 10:11 | PDF | 551KB | 2012/02/06 | Not yet |
| 📄 D.pdf | 2009/01/30 10:10 | PDF | 1KB | 2012/02/08 | Not yet |
| 📄 G.pdf | 2008/08/18 22:14 | PDF | 51KB | 2012/02/11 | Not yet |
| 📄 Z.pdf | 2009/01/30 10:10 | PDF | 11KB | 2012/03/01 | Not yet |

FIG. 12

```
<?xml version="1.0" encoding="utf-16" standalone="yes"?>
<Property>
    <ItemProperty Name="HasMemo" Type="System.Boolean" DisplayName="Memo" Visible="False" Searchable="True" />
    <ItemProperty Name="MemoColor" Type="System.Drawing.Color" DisplayName="Memo Color" Visible="False" Searchable="True" />
    <ItemProperty Name="MemoText" Type="System.String" DisplayName="MemoText" Visible="False" Searchable="True" />
</Property>
```

FIG. 14B

INFORMATION PROCESSING APPARATUS, METHOD FOR CONTROLLING SAME, AND STORAGE MEDIUM

BACKGROUND OF THE INVENTION

Field of the Invention

The present invention relates to an information processing apparatus, and particularly relates to an information processing apparatus that displays a search result in a document management system that can search for a document using its attributes, and to an information processing method.

In recent years, technologies have been disclosed by which data is electronically stored and such electronic data is efficiently managed in companies and the like. For example, Japanese Patent Laid-Open No. 2009-301534 discloses a technology with which a document management system searches for a file according to a user's request. Japanese Patent Laid-Open No. 2009-301534 also discloses a technology for displaying a search result of a file provided with information on a storage device.

However, in the technology of Japanese Patent Laid-Open No. 2009-301534, when an item used as a search condition for searching a file is not included in the items displayed on a screen in advance, the item serving as the search condition cannot be displayed in the search result. Therefore, when using an item that is not displayed on a screen as a search condition, a user had to display in advance the item used as the search condition on the screen before setting the search condition.

SUMMARY OF THE INVENTION

The present invention provides an information processing apparatus that displays a search result based on a search condition when file searching is performed, regardless of the display content of a screen before searching.

One aspect of the present invention is an information processing apparatus that searches for a file based on a search condition, the apparatus comprising: a display unit configured to display a search screen and a search result screen; an item designating unit configured to designate an item as the search condition; an acquiring unit configured to acquire items displayed on the search screen; and an item determination unit configured to determine whether or not the item designated by the item designating unit is included in the items acquired by the acquiring unit, wherein, when the item determination unit determines that the item designated by the item designating unit is not included in the items acquired by the acquiring unit, the display unit adds the item designated by the designating unit to the items acquired by the acquiring unit and displays the search result screen.

According to the present invention, there can be provided an information processing apparatus that displays a search result based on a search condition when file searching is performed, regardless of the display content of a screen before searching.

Further features of the present invention will become apparent from the following description of exemplary embodiments (with reference to the attached drawings).

BRIEF DESCRIPTION OF THE DRAWINGS

FIG. 6 illustrates an example of a program for the registration information in a library.

FIG. 7 illustrates an example of the attribute information present in a library.

FIG. 11A is an example of a display screen illustrating an example of a search condition when a detailed search is performed.

FIG. 11B is an example of a display screen illustrating a search result when a detailed search is performed.

FIG. 12 illustrates an example of the program for generating attribute information.

FIGS. 14A and 14B illustrate examples of display screens when a special attribute is searched for.

DESCRIPTION OF THE EMBODIMENTS

Hereinafter, preferred embodiments of the present invention will be described with reference to the attached drawings.

Figure 1:
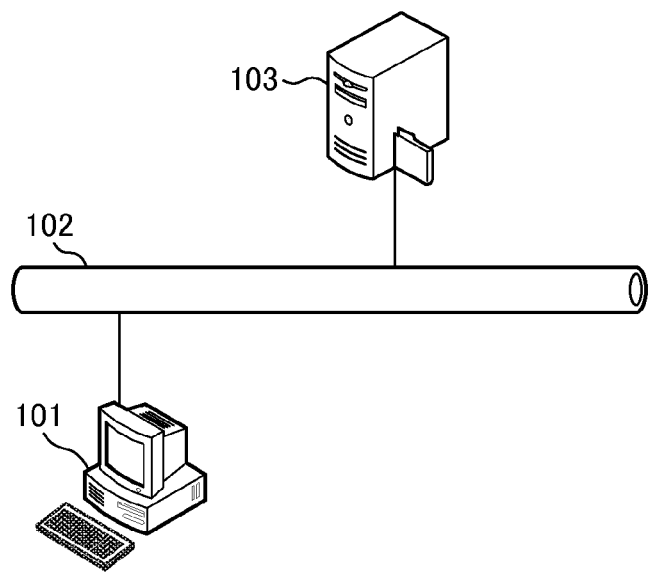
FIG. 1 illustrates the overall configuration according to one embodiment of the present invention.
Figure 2:
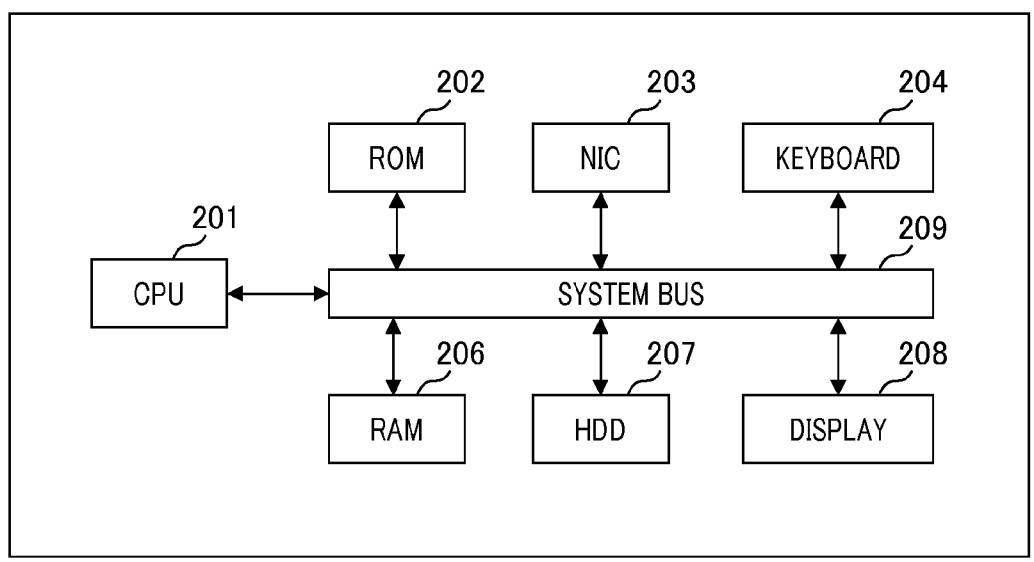
FIG. 2 is a block diagram illustrating the hardware configuration of an information processing apparatus.

FIG. 1 illustrates the overall configuration according to an information processing apparatus according to a first embodiment of the present invention. An information processing apparatus 101 is connected to a documentation management server 103 through a command-communicable network 102. FIG. 2 is a block diagram illustrating the hardware configuration of the information processing apparatus 101 and the documentation management server 103 shown in FIG. 1. Note that the documentation management server 103 is an external device that can be connected to the information processing apparatus 101, and may be, for example, an information processing apparatus such as a personal computer (PC).

A CPU 201 is a central processing unit for controlling the information processing apparatus 101. The CPU 201 executes applications such as an application program, an operating system (OS), a documentation management application, and the like stored in a HDD 207 described later. The CPU 201 also performs control for temporarily storing the information required for executing a program, files, and the like in a RAM 206 described later.

A ROM 202 is a read only memory serving as a storage unit. Inside the ROM 202, a program such as a basic I/O program, font data used for file processing, and various data such as template date are stored. A NIC 203 is a network interface, through which the information processing apparatus 101 sends and receives data to/from an external device. A keyboard 204 is an input device for inputting an instruction, from which a user inputs a control command to an application such as a documentation management application, text, and the like.

The RAM 206 is a random access memory serving as a temporary storage unit, and functions as the main memory of the CPU 201, a work area, or the like. The HDD 207 is a hard disk (HD) that is one type of external storage unit, and functions as a large capacity memory for storing an application program, an OS, the related program(s), and the like. A display 208 is an output device serving as a display unit for displaying a command that is input from the keyboard 204, or a status of an application such as a documentation management application. A system bus 209 is a bus for connecting each component in the information processing apparatus 101 and the documentation management server 103, and controls the flow of data in the information processing apparatus 101 and the documentation management server 103.

Figure 3:
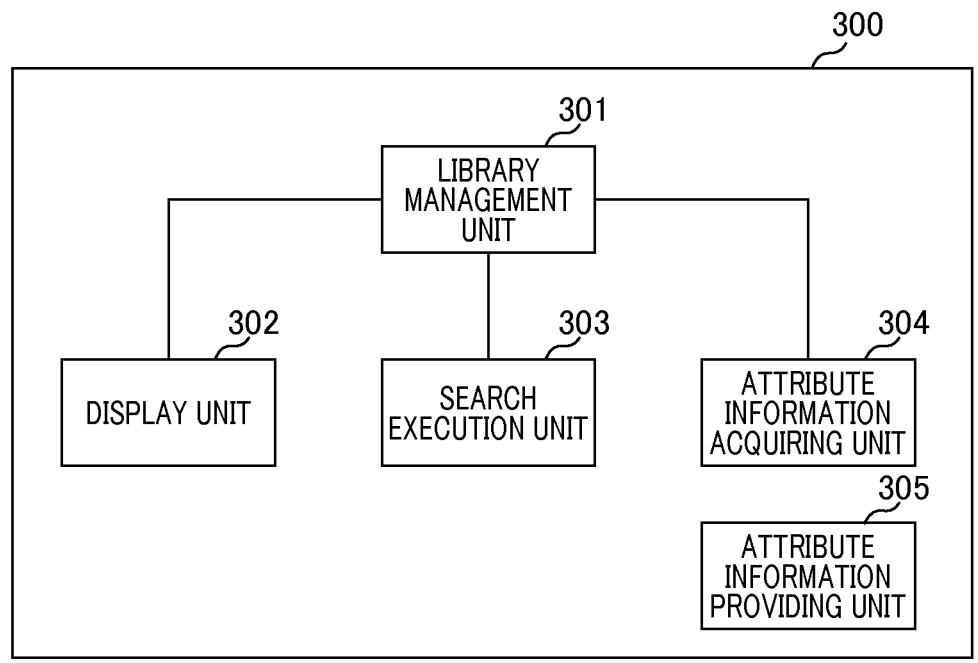
FIG. 3 illustrates an example of the software configuration of a documentation management application.

FIG. 3 illustrates the software configuration of a documentation management application 300 according to the present embodiment. The documentation management application 300 is a program module (computer program) that operates on the information processing apparatus 101, which is loaded into the RAM 206 and executed by the CPU 201. A library management unit 301 manages the locations (positions) of folders, document files, and the like included in a library on the documentation management server 103 to which the documentation management application 300 can refer. The documentation management application 300 refers to the positions of folders and document files included in a library that are managed by the library management unit 301, and performs an operation on a document file.

A display unit 302 receives an input from the keyboard 204, and displays the result of processing by the documentation management application 300 and the like on the display 208. A search execution unit (item determination unit) 303 searches document files managed by the library management unit 301, and causes the display unit 302 to display the search result on the display 208. An attribute information acquiring unit (acquiring unit) 304 acquires attribute information from the documentation management server 103, which attribute information can be utilized as item names when a detailed search is performed.

Figure 4:
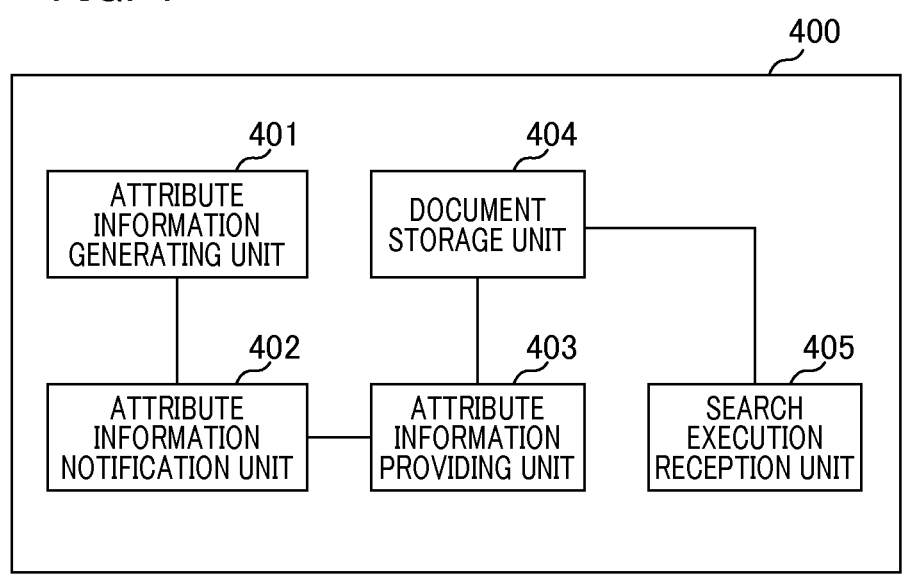
FIG. 4 illustrates an example of the software configuration of a documentation server.

FIG. 4 illustrates the software configuration of the documentation management server 103 according to the present embodiment. A server application 400 notifies the attribute information generated by an attribute information generating unit 401 to an attribute information providing unit 403 by an attribute information notification unit 402. The reported attribute information is provided to the documents stored in a document storage unit 404 by the attribute information providing unit 403, and then to the documentation management application 300. A search execution reception unit 405 receives a search request from the documentation management application 300 and notifies the search result from the document files stored in the document storage unit 404 according to the search request. Note that in the present embodiment, the documentation management application 300 and the server application 400 are configured separately, but the documentation management application 300 may be configured to perform all roles of the server application 400.

Figure 5:
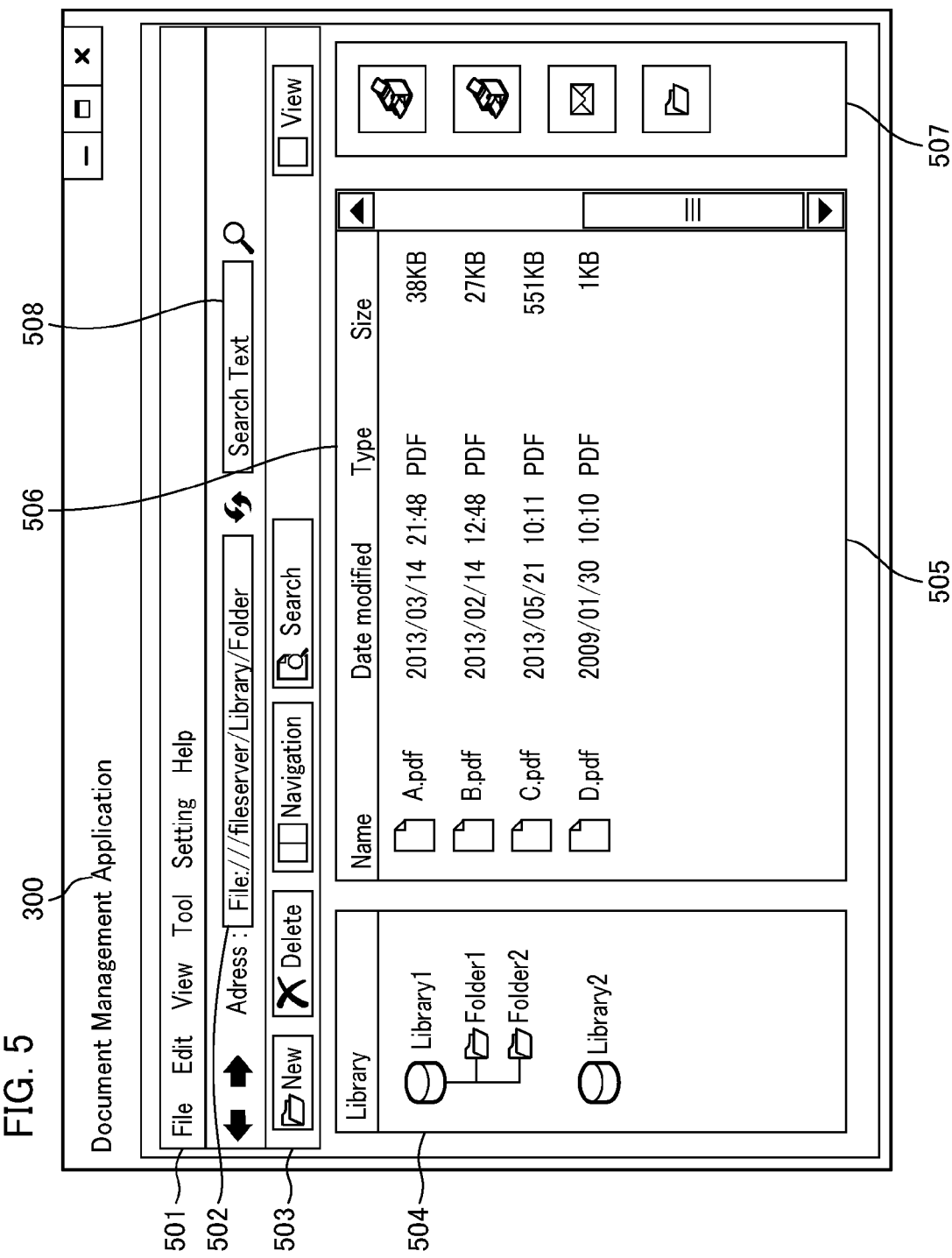
FIG. 5 illustrates an example of the display screen of a documentation management application.

FIG. 5 illustrates an example of a screen for displaying the documentation management application 300. A menu 501 displays a list of execution commands for performing operations on folders and document files. Selecting any of the execution commands causes an operation to be executed. An address bar 502 indicates the position (path) of the folder that is currently being referred to.

A tool bar 503 displays shortcut buttons corresponding to the operations that can be executed using the menu 501. For example, when the display of a file list view 505 described below is switched, the display can be switched by operating the shortcut button of the tool bar 503 instead of selecting the operation from the menu 501. In the present embodiment, for example, the display can be switched to a thumbnail display, a list display, or the like.

A navigation pane 504 displays a list of the registered libraries and the locations of the folders that are currently being referred to. The attribute information on a library provided to document files can be determined by the server application 400 in the unit of a registered library. Note that as to the relationship between a library and a folder, a library is higher in a hierarchy than that of a folder. In other words, a folder is located below a library in terms of the hierarchy. In addition, the attribute information and the like set for a library can also be applied to a folder.

The file list view 505 displays a list of folders and document files designated by the folder path indicated in the address bar 502. The display format of this file list view 505 can be changed by display switching designated by the tool bar 503. FIG. 5 illustrates an example of list display. The file list view 505 displays the document files included in the folder that is being referred to. When the path of the folder is directly input into the address bar 502 from the keyboard 204, the document files included in the folder of the designated path can be displayed as a list in the file list view 505.

A column 506 indicates the attribute information on document files as a column. The display of the column can be switched so as to display or not to display the attribute information present in a library as a column in the unit of a registered library. The current column 506 displays a document name ("Name"), a modification date ("Date Modified"), the type of a document ("Type"), and the size of a document file ("Size"). Note that, the item names to be displayed in the column 506 are designated by a user.

An output bar 507, in which buttons are registered, can cause the actions associated with the buttons to be executed on a document file selected in the file list view 505 by pressing the buttons. In the present embodiment, the actions that can be registered in the output bar 507 include printing, attachment to an e-mail, and movement to a folder. For example, when the button for a printing action is pressed, the documentation management application 300 causes a document file that is being selected at the time to be printed. When the button of the action for attachment to an e-mail is pressed, the documentation management application 300 causes a document file selected at the time to be attached to a new e-mail of the e-mail client associated with the OS. When the button of the action for movement to folder is pressed, the documentation management application 300 causes a document file that is being selected at the time to be moved to the registered folder path.

A search keyword for searching for a document file is input into an easy search bar 508 from the keyboard 204. When a search keyword is input into the easy search bar 508, document files including the search keyword are displayed as a list in a separate window as the result.

FIG. 6 illustrates a program example for the registration information for a library. Note that, in the present embodiment, as shown in FIG. 6, the registration information for a library is described in XML. However, the language is not limited thereto provided that the documentation management application 300 can interpret. In the present embodiment, a setting value 601 describes the display name of a registered library as "DisplayName", the path denoting a storage destination as "LibraryRootPath", and the type of the storage destination "ProtrolHandlerType".

FIG. 7 illustrates an example of the attribute information present in a library. An item value 701 is a description example of the attributes registered in the library. In the present embodiment, an item name is described as "Name", the type of an attribute as "Type", a display name of an attribute as "DisplayName", the possibility to be displayed as "Visible", and the possibility to be searched as "Searchable". The item name is a name for identifying the attribute so as to be the only one. The type of an attribute defines the utilized type of an item value. The types include a character string type, a date type, a numeric type, and the like, and depending on the type, a content to be displayed and a search condition vary. Note that the display name of an attribute is the item name to be displayed on a screen. This item name is also displayed in the column 506. The possibility to be displayed defines whether or not attribute information is displayed in the column 506. The attribute information that is not "Visible" will not be displayed in the column 506. The possibility to be searched defines whether or not an attribute can be searched. The attribute information that is not "Searchable" will not be displayed as a search condition. Among attribute information, there is an item that is included as a search condition, but cannot be displayed in the column 506.

Figure 8A:
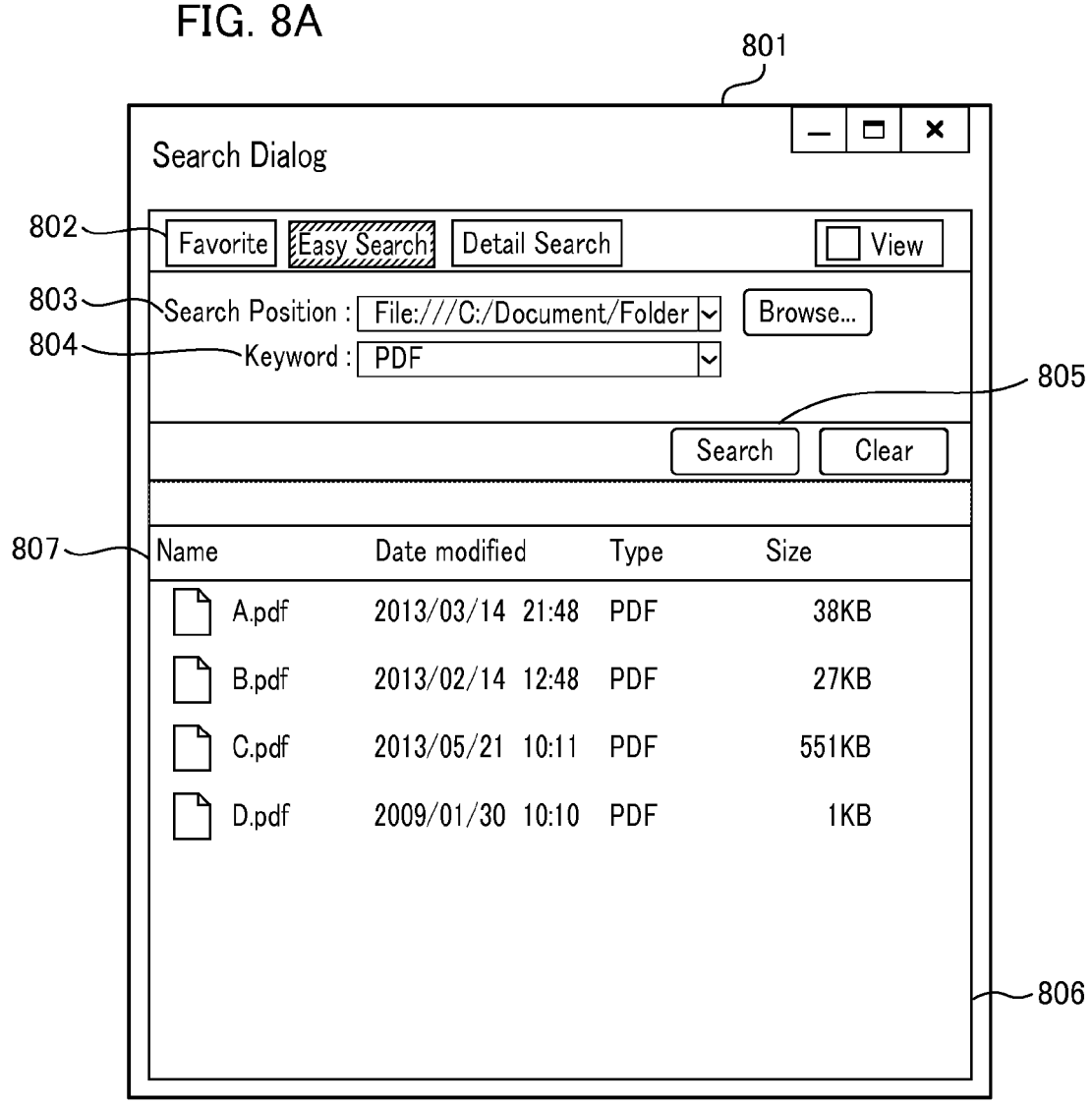
FIG. 8A illustrates an example of a display screen illustrating a search result by an easy search, the screen being displayed in a separate window.
Figure 8B:
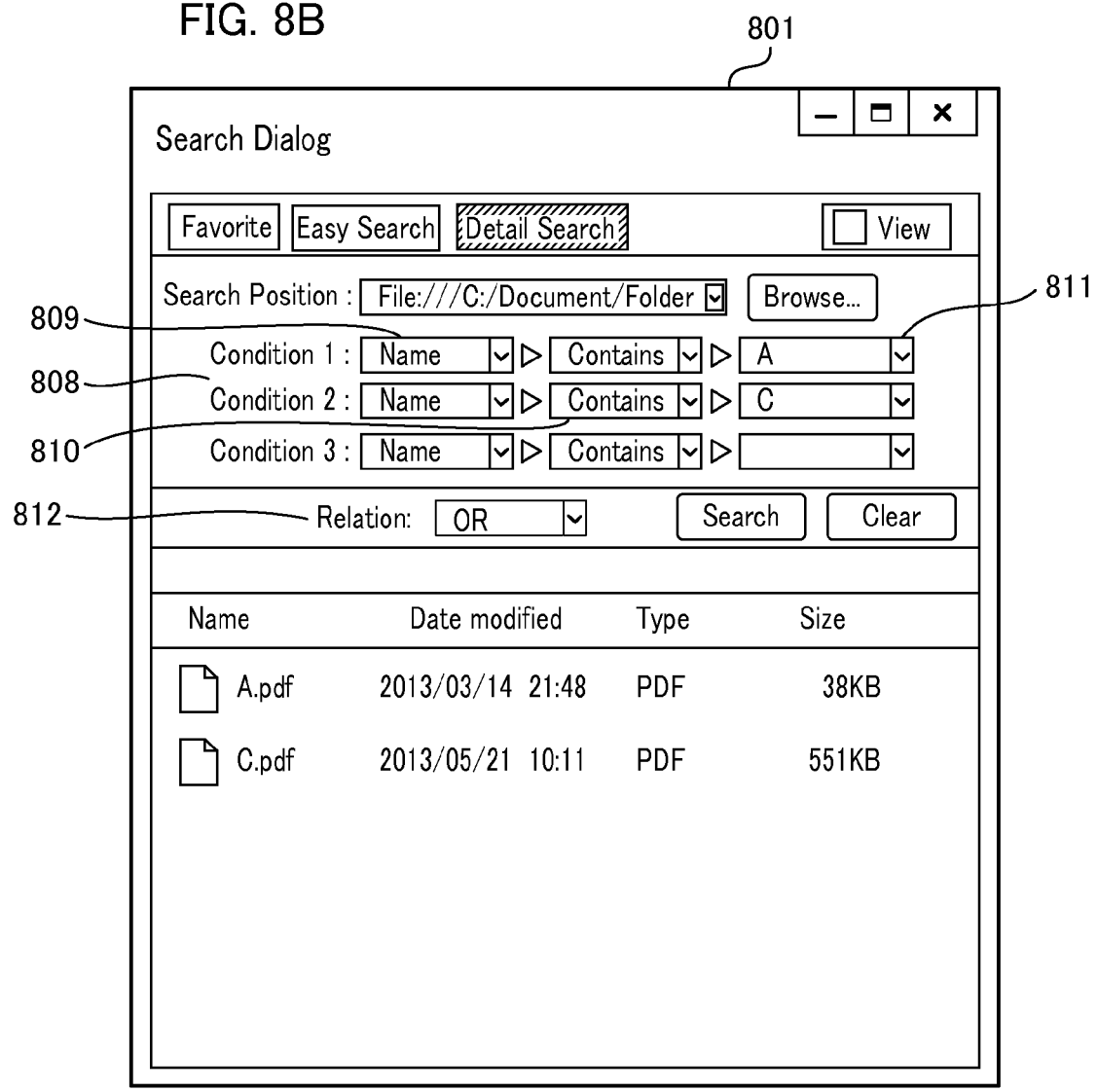
FIG. 8B illustrates an example of a display screen illustrating a search result by a detailed search, the screen being displayed in a separate window.

FIGS. 8A and 8B illustrate examples of display screens of search results that are displayed in separate windows. FIG. 8A illustrates a display example of a window showing a search result when an easy search is performed. FIG. 8B illustrates a display example of a window showing a search result when a detailed search (in which a plurality of item names are designated) is performed. The explanation for the same reference numerals as ones in FIG. 8A is omitted.

When a search keyword is input into the easy search bar 508 and a search is performed or when a search window is displayed using the menu 501 or the tool bar 503, a search window (search screen) 801 that is a secondary window of the documentation management application 300 is displayed. A tool bar 802 is a tool bar for an operation such as switching the display of the search window 801, and the like. In the present embodiment, the buttons for switching the display between an easy search and a detailed search and for switching the display of a search result display file list view 806 described below between a thumbnail display and a list display are arranged. In addition, the buttons for saving a search condition or calling the saved search condition are arranged.

A combo box 803 that receives designation of a search position is used to designate the position for searching for a folder and/or a document in a library. A method for describing this position may be the same, for example, as in the address bar 502. A keyword text box 804 is a text box for inputting a keyword in order to search for the desired folder or a document file in the folders or document files in a search position 803. Using a character string that is input into the keyword text box 804, a folder and/or a document file having that character string is searched for. For example, a keyword that is input into the easy search bar 508 is automatically input into this text box.

A search execution button 805 is a button for starting to search for a folder and/or a document file having the character string that is input into the keyword text box 804 in the position that is input into the combo box 803. When the search execution button 805 is pressed, folders and/or document files having the keyword in the keyword text box 804 are displayed in the search result display file list view (search result screen) 806. A column 807 can display as a column the same attribute information as one in the column 506 displayed in the documentation management application 300.

Referring to FIG. 8B, a condition for searching for a folder and/or a document file is set by designating the attribute information provided to document files as a search condition in an attribute search condition 808. The attribute search condition 808 can also allow for designating a plurality of search conditions. Then, an AND search or an OR search can be designated in a relationship designation combo box 812 for conditional expression for the plurality of search conditions. An item name combo box (item designating unit) 809 lists the searchable items based on the attribute information present in the position designated by the combo box 803.

A combo box 810 that receives a designation of a search condition is a combo box for designating a search condition according to the item name designated in the item name combo box 809. The search condition that can be designated in the combo box 810 varies depending on the attribute designated in the item name combo box 809. This search condition is determined by the type of the attribute corresponding to the item name designated in the item name combo box 809. A search keyword 811 is a text box for inputting a keyword for searching the position that is input into the combo box 803 based on the search condition designated in the combo box 810.

In the search window 801 shown in FIG. 8B, the position designated in the combo box 803 is searched by pressing the search execution button 805 and the search result is displayed in the file list view 806. Search conditions are designated in the item name combo box 809, the combo box 810, and the search keyword 811 in the attribute search condition 808, for which a AND search or a OR search is designated in the relationship designation combo box 812 for performing a search.

Figure 9:
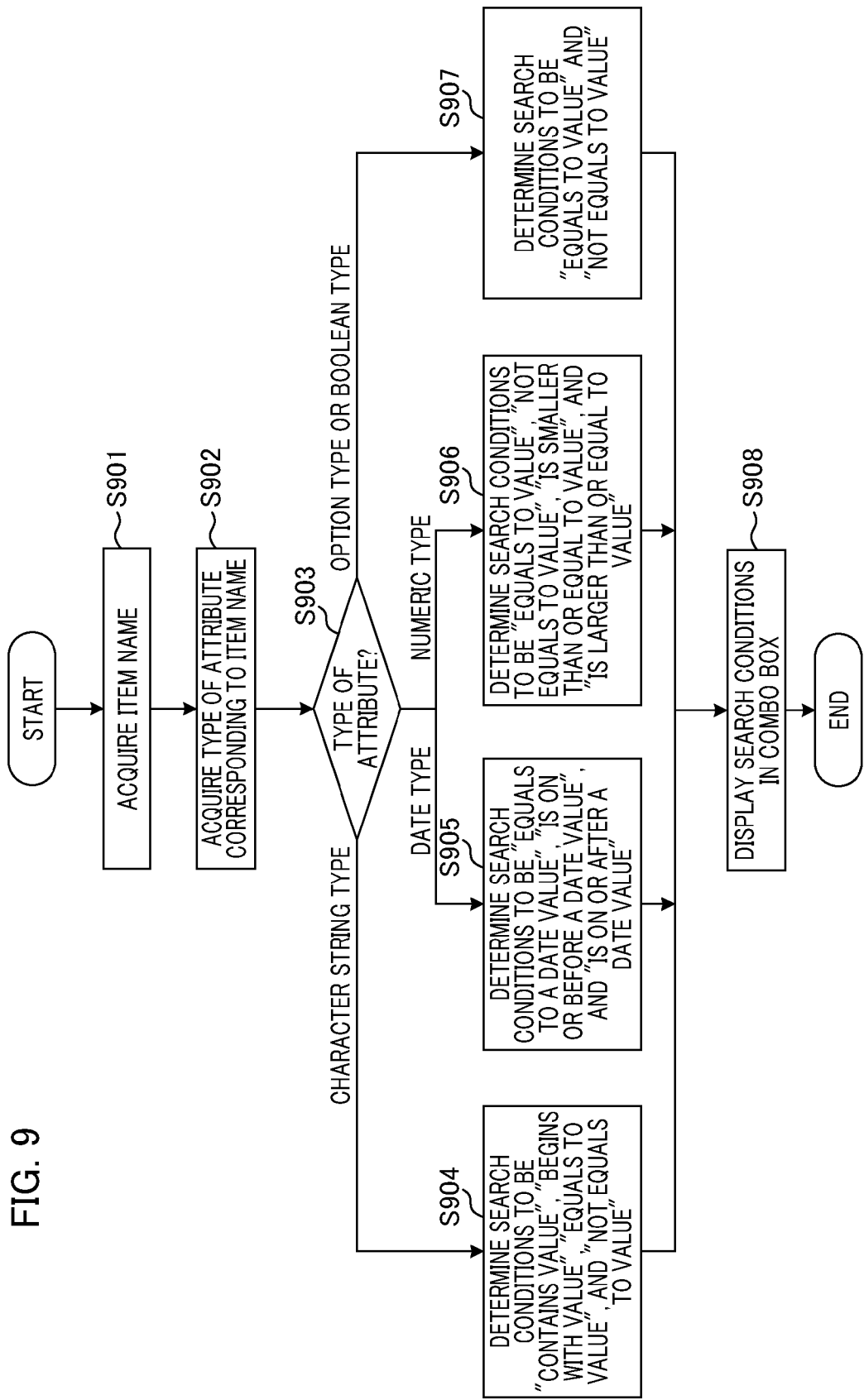
FIG. 9 is a flowchart illustrating a method for determining a search condition according to the type of an attribute.

FIG. 9 illustrates the flow of the processing for determining a search condition based on the type of an attribute. Note that each step of the flowchart according to the present embodiment is implemented by loading the program related to the flowchart into the RAM 206 and executing it by the CPU 201.

First, the documentation management application 300 acquires attribute information from the library in the search position designated in the combo box 803, and acquires the item name designated in the item name combo box 809 (step S901). Next, the documentation management application 300 acquires the type of the attribute corresponding to the item name based on the attribute information acquired from the library (step S902). In order to determine the search condition predefined according to the type of the attribute, the documentation management application 300 determines the type of the attribute (step S903).

When the type of the attribute is a character string type, the documentation management application 300 determines the search conditions to be "contains a value", "begins with a value", "equals to a value", and "not equals to a value" (step S904). When the type of the attribute is a date type, the documentation management application 300 determines the search conditions to be "equals to a date value", "is on or before a date value", and "is on or after a date value" (step S905). When the type of the attribute is a numeric type, the documentation management application 300 determines the search conditions to be "equal to a value", "not equal to a value", "is smaller than or equal to a value", and "is larger than or equal to a value" (step S906). In addition, when the type of the attribute is an option type or Boolean type, the documentation management application 300 determines the search conditions to be "equal to a value" and "not equal to a value" (step S907).

Next, the documentation management application 300 displays the search conditions determined in the above-described steps S904 to S907 in the combo box 810 (step S908). Note that, in the present embodiment, the search conditions are determined based on the type of the attribute, but they may be determined in other ways without limitation.

Figure 10:
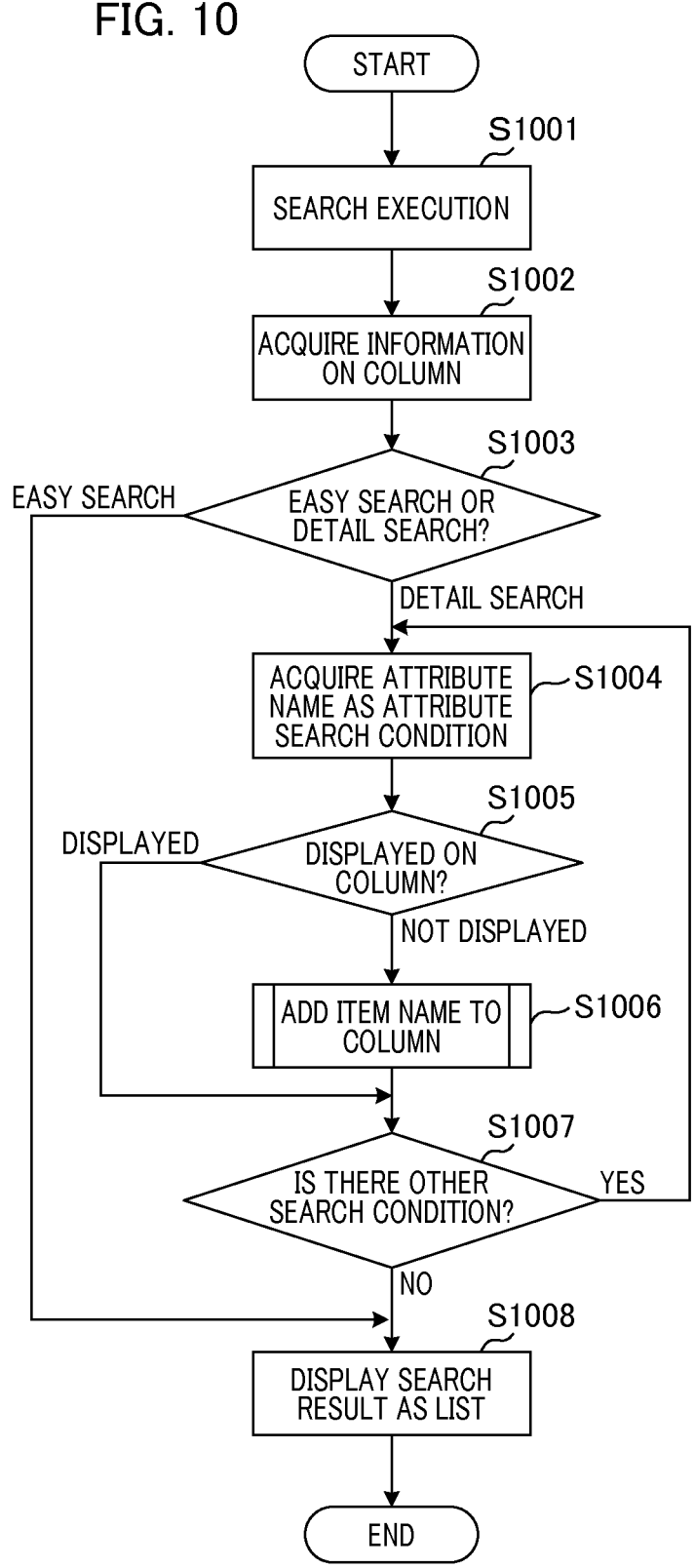
FIG. 10 is a flowchart illustrating the processing for changing the display of a column when a detailed search is performed.

Next, referring to FIG. 10, the processing for changing the display of the column 807 according to a search condition when a detailed search according to the present embodiment is performed will be described. In this processing, when a detailed search is performed and the search result is displayed, the documentation management application 300 determines whether or not the item name used as the search condition is present in the column, and accordingly changes the display of the column 807 in the search result display file list view 806.

When the search execution button 805 in the search window 801 is pressed, the documentation management application 300 starts to search for a folder and/or a document file (step S1001). Then, the documentation management application 300 acquires the information on the column displayed in the column 506 (step S1002).

Next, the documentation management application 300 determines whether the search is an easy search, in which a keyword is designated in the keyword text box 804, or a detailed search, in which a search condition is designated in the attribute search condition 808 (step S1003). When it is determined that the search is a detail search, the documentation management application 300 acquires the item name (attribute name) designated in the item name combo box 809 in the attribute search condition 808 (step S1004).

Next, the documentation management application 300 determines whether or not the item name acquired in step S1004 is displayed in the column 506, whose information is acquired in step S1002 (step S1005). When it is determined that the item name is not displayed in the column, the documentation management application 300 adds the item name that is not displayed to the column in order to display the item name that is not displayed in the column 807 (step S1006). Note that, in the present embodiment, the item name that is not displayed in the column is added to the predetermined location, that is, the end of the column 807 (the right end of the item names in the column 807). On the other hand, when it is determined that the item name is displayed in the column 506, it is not added to the column 807.

Next, the documentation management application 300 determines whether or not there is any other search condition designated in the attribute search condition 808 (step S1007). When it is determined that there is another search condition, the processing returns to step S1004, and is continued. On the other hand, when it is determined that there is no other search condition, the documentation management application 300 displays the search result in the search result display file list view 806 (step S1008).

On the other hand, when it is determined that the search is an easy search in step S1003, the documentation management application 300 applies the column information acquired in step S1002 to the column 807. Then, the documentation management application 300 displays the search result in the search result display file list view 806 (step S1008).

Thus, for every attribute search condition 808 (each item), it is determined whether or not the item name is displayed in the column 506. When the item name is not in the column, the item name is added to the column and that column information is applied to the column 807, and the search result is displayed in the search result display file list view 806.

With the above configuration, even when the item name used by a user when a search is performed is not displayed in the column 506 before searching, the item name is added to the column 807 when the search result is displayed, thereby allowing the search result to be displayed in the search result display file list view 806. Accordingly, even when a user sets a search condition regardless of the item names displayed in the column 506, the search result of a folder and/or a document file can be displayed, which eliminates the need to display the column 506 in advance when a search is performed. As the result, the number of operations for searching for a folder and/or document file can be reduced.

Next, a screen displayed when a detailed search according to the present embodiment is performed will be described with reference to FIGS. 11A and 11B. FIG. 11A illustrates a screen in which the attribute search conditions for a detailed search are designated. For example, it is shown how to search for a document file when a person is doing work with only the names and types of documents displayed in the column, but has to work on the documents for which deadlines are on or before the specified date and for which the status is "not yet", in the order from an earlier deadline, when having received such a request. Here, the attribute information on a library includes "Deadline" for a deadline and "Status" for a status in order to manage the attributes. In this case, the attribute "Deadline" is set to "on or before 2013, Mar. 29", the attribute "Status" contains "Not yet", and the attribute "Name" contains "PDF" as the attribute search conditions. Note that in the column before searching in FIG. 11A, "Name" (document name), "Date Modified" (modification date), "Type" (type of a document), and "Size" (file size of a document) are displayed.

FIG. 11B illustrates the result based on the above search conditions. In FIG. 11A, "Deadline" and "Status" as the search conditions are not displayed in the column. Accordingly, by performing the processing shown in FIG. 10 as described above, the documentation management application 300 adds "Deadline" and "Status" to the column and displays them in the search result shown in FIG. 11B. In addition, the dates in "Deadline" are displayed after being sorted. Such an operation allows work to be done in the order from an earlier deadline.

As described above, according to the present embodiment, when an item included as a search condition is not displayed on a screen before searching, a search result can be displayed in which the item as the search condition is added. Therefore, the search result can be displayed regardless of the display status of the screen before searching.

Second Embodiment

In the first embodiment, when an item name set as a search condition is not displayed in the column, it is added to the end of the column and is displayed. However, there is an attribute that exists and can be searched, but is set not to be displayed in the column as attribute information. How to display the search result for such an attribute will be described below.

First, in the present embodiment, an attribute "memo" will be explained as one example. The attribute "memo" is generated from a plurality of attributes as the attribute information on a library. FIG. 12 illustrates an example of a program for generating the attribute information on the "memo". As described in the program for generating the attribute information shown in FIG. 12, the "memo" is generated from the following three attributes.

(1) An item name of "Memo" showing the presence or absence of the "memo" that cannot be displayed in a Boolean type, but can be searched.

(2) An item name of "Memo Color" showing the background color of the "memo" that cannot be displayed in a color type, but can be searched.

(3) An item name of "Memo Text" showing text of the "memo" that cannot be displayed in a character string type, but can be searched.

Figure 13:
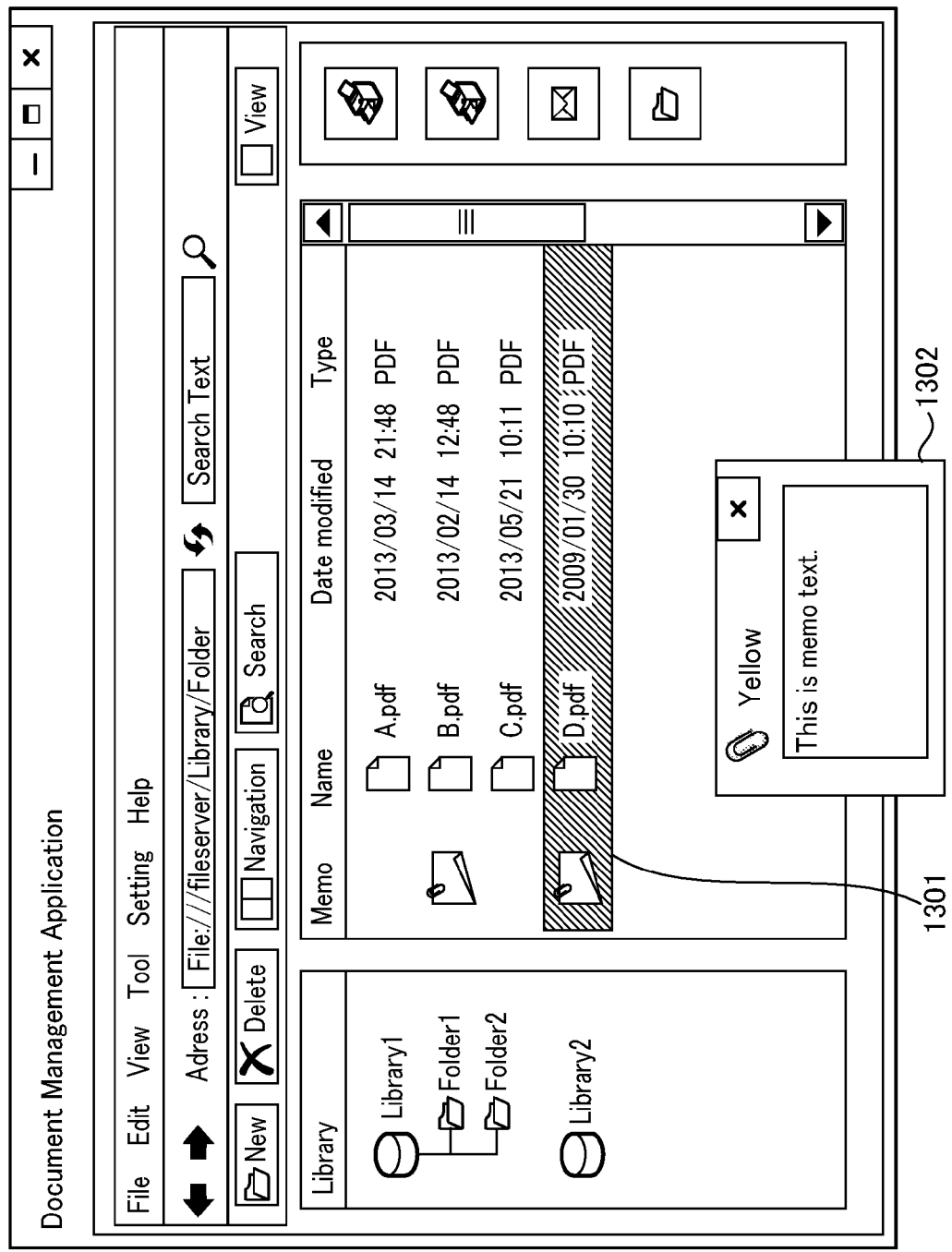
FIG. 13 illustrates a display example of a "memo" in a documentation management application.

FIG. 13 illustrates a display example of the "memo". The "memo" is displayed by a memo icon 1301 on the display screen of the documentation management application 300. The memo icon 1301 is created as, for example, a combination of the types defined in FIG. 12. When the memo icon 1301 is selected, a memo dialog 1302 is displayed, in which the background color or text of the "memo" can be designated. The background color of the "memo" may be varied in association with the color of the icon.

Figure 14A:
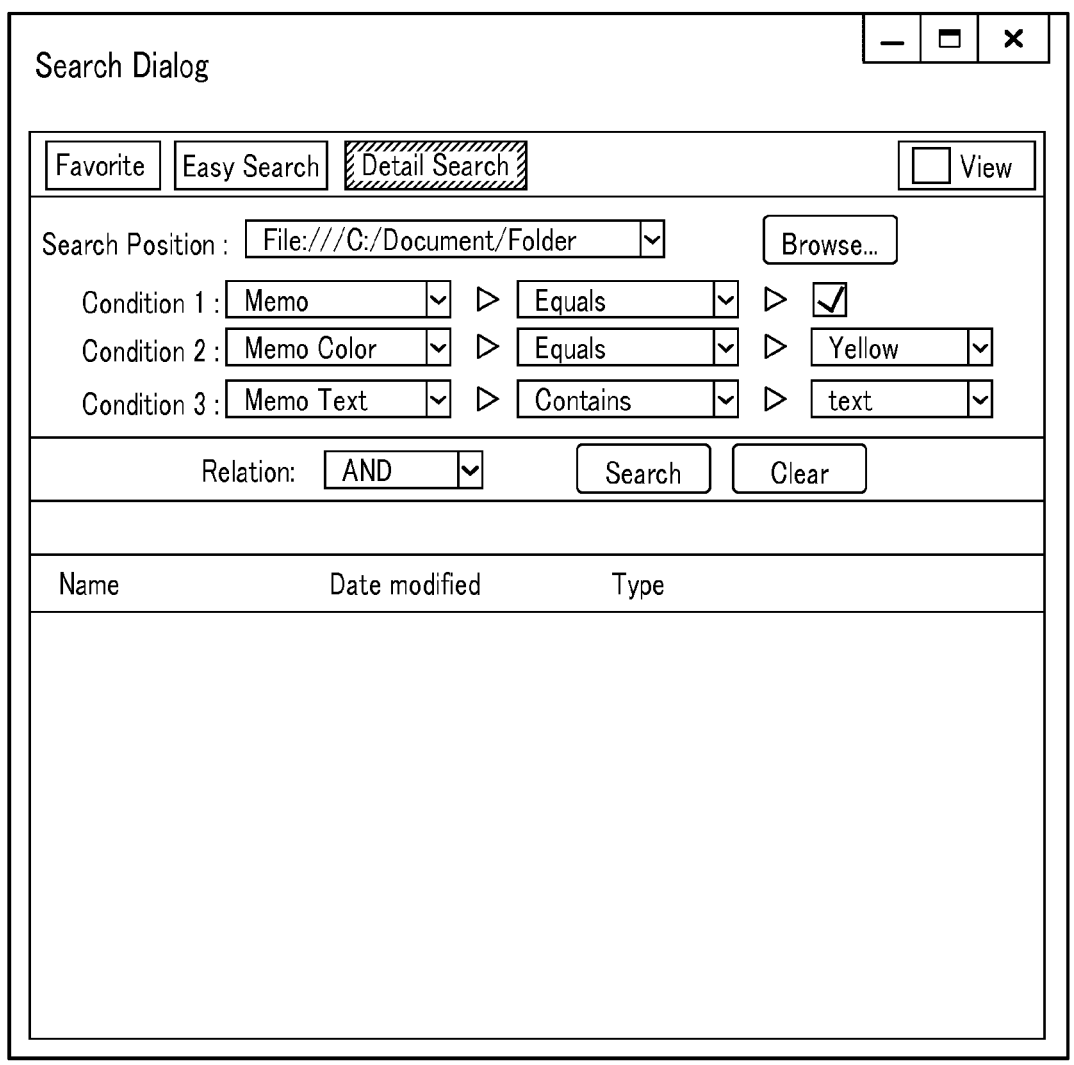
Figure 14B:
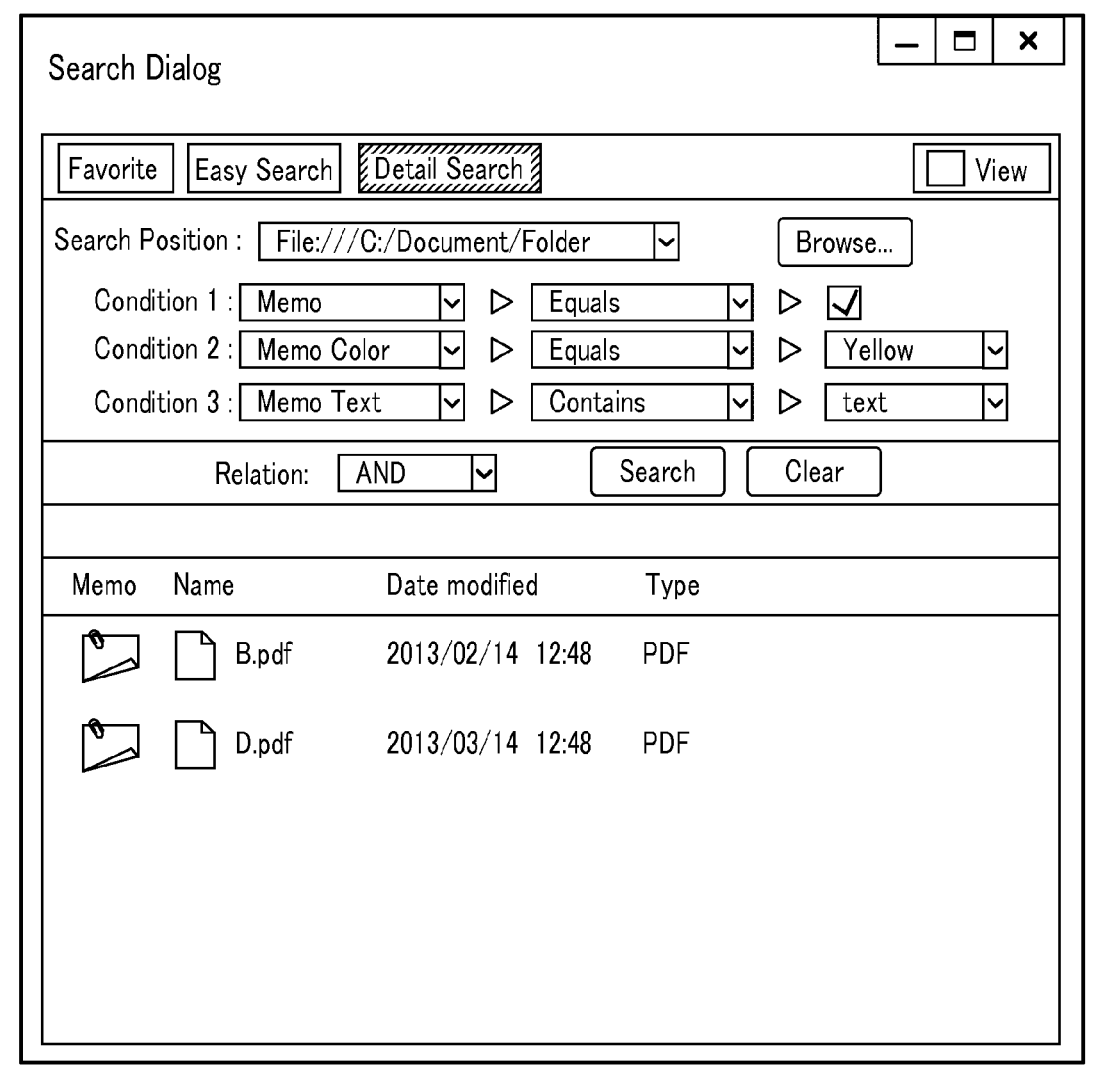

FIGS. 14A and 14B illustrate examples of search screens when searching for an attribute of the "memo" according to the present embodiment. FIG. 14A illustrates a screen in which the search conditions are designated. "Memo", "Memo Color", and "Memo Text" are designated as the search conditions regarding the "memo". FIG. 14B shows an example of the search result regarding the "memo". Since "Memo", "Memo Color", and "Memo Text" cannot be displayed in the search result, they are individually neither added to the column nor displayed, but instead the memo icon 1301 is added to the file list view.

Figure 15:
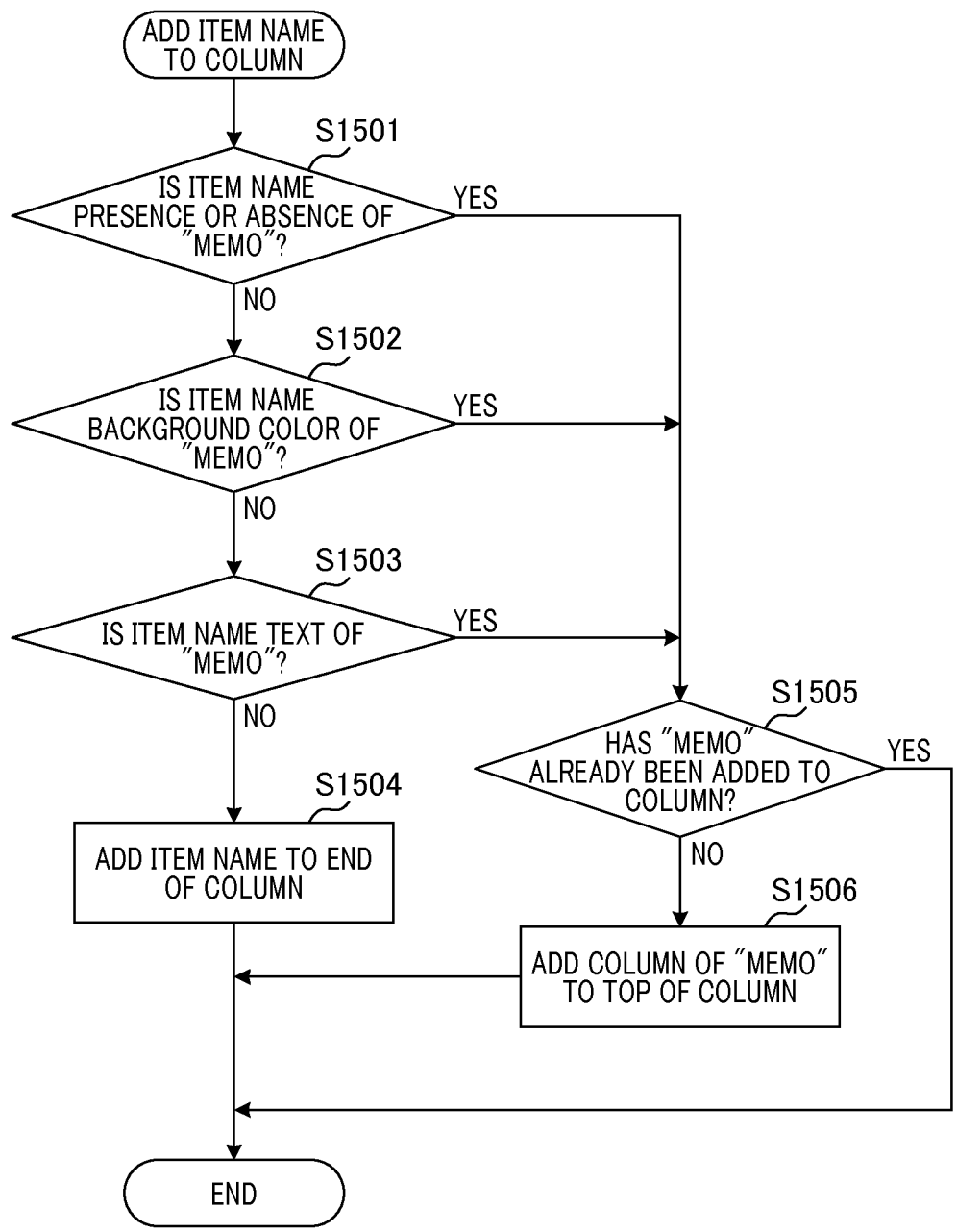
FIG. 15 is a flowchart illustrating the processing for displaying an attribute "memo" in a column.

Referring to the flowchart shown in FIG. 15, the processing for searching for an attribute of the "memo" will be explained. Note that, the flow shown in FIG. 15 is performed during the processing for adding an item name to the column in the above-described step S1006. First, the documentation management application 300 determines whether or not the item name as an attribute search condition is the presence or absence of the "memo" (step S1501). When it is determined that it is not the presence or absence of the "memo", the documentation management application 300 determines whether or not the item name as the attribute search condition is the background color of the "memo" (step S1502). When it is determined that the item name is not the background color of the "memo", the documentation management application 300 determines whether or not the item name as the attribute search condition is the text of the "memo" (step S1503). When it is determined that the item name is not the text of the "memo", the documentation management application 300 adds the item name acquired in S1004 to the end of the column (step S1504).

On the other hand, when it is determined to be "Yes" in at least one of steps S1501 to S1503, it is determined whether or not the "memo" has already been added to the column (step S1505). When it is determined that the "memo" has not been added to the column, the documentation management application 300 adds the column of the "memo" to the top of the column (step S1506). On the other hand, when it is determined that it has already been added in step S1505, the addition is skipped. The result from the above processing is shown in FIG. 14B. In FIGS. 14A and 14B, a special item name of "Memo" is added to the top of the column.

As described above, according to the present embodiment, even when a special attribute (display format) such as the "memo" is set as a search condition, the search result can be displayed by adding the column showing that attribute. In addition, since a special attribute such as the "memo" is different from the other attributes, the visibility can be improved by its addition to the top of the column, for example. Therefore, regardless of the display status of a screen before searching, the search result can be displayed.

Third Embodiment

Although, in the above-described first and second embodiments, the search window is displayed in a separate window, the search result can also be displayed in the file list view of an ordinary documentation management application. In such a case, the attribute added to the search result is displayed in the column only in the search result display state, and the added attribute is deleted when the display returns to the ordinary file list view display. This allows only the attribute designated in the search result to be displayed when a search is performed.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-088667, filed on Apr. 19, 2013, which is hereby incorporated by reference herein in its entirety.

What is claimed is:
1. An information processing apparatus comprising:
a memory configured to store a computer program; and a hardware-processor configured to execute the computer program, wherein the hardware-processor in executing the computer program controls to cause the information processing apparatus to:

display a search screen and a search result screen on a display, wherein the search screen is used for setting a search condition designated by a user, and wherein the search result screen displays a list of files that are searched-for based on the search condition, and wherein information displayed for the searched-for files in the list includes attribute information, that corresponds to first item names designated in first columns of the list, for each of the searched-for files;

receive both of a second item name and a search keyword that are set as the search condition via the search screen by the user;

search for second files based on the received second item name and the received search keyword;

acquire the first item names designated in the first columns being displayed on the search result screen;

determine whether the received second item name is included in the acquired first item names; and automatically add, without further receiving an additional instruction from the user, a second column corresponding to the second item name to the first columns being displayed on the search result screen if it is determined that the received second item name is not included in the acquired first item names, wherein the search result screen displays a second list of the second searched-for files after the second column is added automatically, and wherein information displayed for the second searched-for files in the displayed second list includes attribute information, that corresponds to the second item name designated in the automatically added second column and the first item names designated in the first columns, for each of the second searched-for files.

2. The information processing apparatus according to claim 1, wherein, if a plurality of second item names and search keywords are set as the search condition via the search screen, the hardware-processor controls to determine whether all of the plurality of second item names are included in the acquired first item names.

3. The information, processing apparatus according to claim 1,
wherein the hardware-processor controls to add the second column corresponding to the second item name to a predetermined location of the first columns being displayed on the search result screen if it is determined that the received second item name is not included in the acquired first item names.

4. The information processing apparatus according to claim 3, wherein the predetermined location is the end of the first columns being displayed on the search result screen.

5. The information processing apparatus according to claim 1, wherein the hardware-processor further controls to:
determine whether the received second item name is a predetermined item name that is to be displayed as an icon when it is determined that the received second item name is not included in the acquired first item names; and
automatically add, without further receiving the additional instruction from the user, a third column corresponding to the predetermined item name to the first columns being displayed on the search result screen when it is determined that the received second item name is the predetermined item name, wherein the search result screen further displays an icon, that indicates information corresponding to the predetermined item name, in the automatically added third column for each of the second searched-for files.

6. The information processing apparatus according to claim 5, wherein the hardware-processor controls to add the third column corresponding to the predetermined item name to a top of the first columns being displayed on the search result screen.

7. A method executed by a hardware-processor of an information processing apparatus, the method comprising:
displaying a search screen on a display unit of the information processing apparatus, wherein the search screen is used for setting a search condition designated by a user;
displaying a search result screen on the display unit of the information processing apparatus, wherein the search result screen displays a list of files searched-for based on the search condition, wherein information displayed for the searched-for files in the list includes attribute information, that corresponds to first item names designated in first columns of the list, for each of the searched-for files;
receiving both of a second item name and a search keyword that are set as the search condition via the search screen by the user;
searching for second files based on the received second item name and the received search keyword;
acquiring the first item names designated in the first columns being displayed on the search result screen;
determining whether the received second item name is included in the acquired first item names; and
automatically adding, without further receiving an additional instruction from the user, a second column corresponding to the second item name to the first columns being displayed on the search result screen if it is determined that the received second item name is not included in the acquired first item names,
wherein the search result screen displays a second list of the second searched-for files after the second column is added automatically, and
wherein information displayed for the second searched-for files in the displayed second list includes attribute information, that corresponds to the second item name designated in the automatically added second column and the first item names designated in the first columns, for each of the second searched-for files.

8. A non-transitory computer-readable storage medium storing a computer program for causing a computer to perform:
displaying a search screen on a display unit of the information processing apparatus, wherein the search screen is used for setting a search condition designated by a user;
displaying a search result screen on the display unit of the information processing apparatus, wherein the search result screen displays a list of files searched-for based on the search condition, wherein information displayed for the searched-for files in the list includes attribute information, that corresponds to first item names designated in first columns of the list, for each of the searched-for files;
receiving both of a second item name and a search keyword that are set as the search condition via the search screen by the user;
searching for second files based on the received second item name and the received search keyword;

acquiring the first item names designated in the first columns being displayed on the search result screen;
determining whether the received second item name is included in the acquired first item names; and
automatically adding, without an additional instruction from the user, a second column corresponding to the second item name to the first columns being displayed on the search result screen if it is determined that the received second item name is not included in the acquired first item names, wherein the search result screen displays a second list of the second searched-for files after the second column is added automatically, and wherein information displayed for the second searched-for files in the displayed second list includes attribute information, that corresponds to the second item name designated in the automatically added second column and the first item names designated in the first columns, for each of the second searched-for files.

9. The non-transitory storage medium according to claim 8, wherein, if a plurality of second item names and search keywords are set as the search condition via the search screen, it is determined whether all of the plurality of second item names are included in the acquired first item names.

10. The non-transitory storage medium according to claim 8,
wherein the second column corresponding to the second item name is added to a predetermined location of the first columns being displayed on the search result screen if it is determined that the received second item name is not included in the acquired first item names.

11. The non-transitory storage medium according to claim 10, wherein the predetermined location is the end of the first columns being displayed on the search result screen.

12. The non-transitory storage medium according to claim 8, wherein the program further causes the computer to perform:
determining whether the received second item name is a predetermined item name that is displayed as an icon when it is determined that the received second item name is not included in the acquired first item names; and
automatically adding, without further receiving the additional instruction from the user, a third column corresponding to the predetermined item name to the first columns being displayed on the search result screen when it is determined that the received second item name is the predetermined item name, wherein the search result screen further displays an icon that indicates information corresponding to the predetermined item name, in the added third column for each of the second searched-for files.

13. The non-transitory storage medium according to claim 12, wherein the third column corresponding to the predetermined item name is added to a top of the first columns being displayed on the search result screen.

14. An information processing apparatus comprising:
a memory configured to store a computer program; and
a hardware-processor configured to execute the computer program, wherein the hardware-processor in executing the computer program controls to cause the information processing apparatus to:
acquire first item names to be displayed in first columns of a list of files, wherein the first item names are designated by a user;
display a search screen for setting a search condition designated by the user;
receive both of a second item name and a search keyword that are set as the search condition via the search screen by the user;
search for files based on the received second item name and the received search keyword; and
display a search result screen for displaying a list of files that are searched-for based on the received second item name and the received search keyword,
wherein the search result screen displays, without further receiving an additional instruction from the user, the list of the searched-for files that includes first attribute information corresponding to the acquired first item names and second attribute information corresponding to the received second item name for each of the searched-for files if the received second item name does not exist in the acquired first item names, and
wherein the search result screen displays the list of the searched-for files that includes first attribute information corresponding to the acquired first item names for each of the searched-for files if the received second item name exists in the acquired first item names.

15. The information processing apparatus according to claim 14, wherein the search result screen displays the list of the searched-for files that includes the first attribute info on and the second attribute information for each of the searched-for files if the received second item name does not exist in the acquired first item names, the second attribute information being displayed in a second column which is added at right of the first columns in which the first attribute information is displayed.

16. An information processing method executed by a hardware-processor of an information processing apparatus, the method comprising:
acquiring first item names to be displayed in first columns of a list of files, wherein the first item names are designated by a user;
displaying a search screen for setting a search condition designated by the user;
receiving both of a second item name and a search keyword that are set as the search condition via the search screen by the user;
searching for files based on the received second item name and the received search keyword; and
displaying a search result screen for displaying a list of files that are searched-for based on the received second item name and the received search keyword,
wherein the search result screen displays, without further receiving an additional instruction from the user, the list of the searched-for files that includes first attribute information corresponding to the acquired first item names and second attribute information corresponding to the received second item name for each of the searched-for files if the received second item name does not exist in the acquired first item names, and
wherein the search result screen displays the list of the searched-for files that includes first attribute information corresponding to the acquired first item names for each of the searched-for files if the received second item name exists in the acquired first item names.

17. A non-transitory computer-readable storage medium storing a computer program for causing a computer to perform:
acquiring first item names to be displayed in first columns of a list of files, wherein the first item names are designated by a user;
displaying a search screen for setting a search condition designated by the user;

receiving both of a second item name and a search keyword that are set as the search condition via the search screen by the user;

searching for files based on the received second item name and the received. search keyword; and displaying a search result screen for displaying a list of files that are searched-for based on the received second item name and the received search keyword, wherein the search result screen displays, without further receiving an additional instruction from the user, the list of the searched-for files that includes first attribute information corresponding to the acquired first item names and second attribute information corresponding to the received second item name for each of the searched-for files if the received second item name does not exist in the acquired first item names, and wherein the search result screen displays the list of the searched-for files that includes first attribute information corresponding to the acquired first item names for each of the searched-for files if the received second item name exists in the acquired first item names.

* * * * *